United States Patent
Satou (10) Patent No.: US 11,436,754 B2
(45) Date of Patent: Sep. 6, 2022

(54) POSITION POSTURE IDENTIFICATION DEVICE, POSITION POSTURE IDENTIFICATION METHOD AND POSITION POSTURE IDENTIFICATION PROGRAM

(71) Applicant: FANUC CORPORATION, Yamanashi (JP)

(72) Inventor: Taiga Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/929,501

(22) Filed: Jul. 15, 2020

(65) Prior Publication Data

US 2021/0027491 A1  Jan. 28, 2021

(30) Foreign Application Priority Data

Jul. 22, 2019  (JP) .............................. JP2019-134696

(51) Int. Cl.
*G06T 7/73* (2017.01)
*G06T 7/50* (2017.01)
(Continued)

(52) U.S. Cl.
CPC .............. *G06T 7/75* (2017.01); *G06T 3/0006* (2013.01); *G06T 7/50* (2017.01); *B25J 9/1664* (2013.01);
(Continued)

(58) Field of Classification Search
CPC .............. G06T 7/75; G06T 2207/10028; G06T 2207/30164
See application file for complete search history.

(56) References Cited

U.S. PATENT DOCUMENTS

| 8,165,403 B1* | 4/2012 | Ramalingam | G06T 7/75 382/190 |
| 2011/0206274 A1* | 8/2011 | Tateno | G06T 7/75 382/154 |

(Continued)

FOREIGN PATENT DOCUMENTS

JP  2017-102529  6/2017

OTHER PUBLICATIONS

Guehring, Jens. "Reliable 3D surface acquisition, registration and validation using statistical error models." Proceedings Third International Conference on 3-D Digital Imaging and Modeling. IEEE, 2001 (Year: 2001).*

(Continued)

*Primary Examiner* — Diane M Wills
(74) *Attorney, Agent, or Firm* — Wenderoth, Lind & Ponack, L.L.P.

(57) ABSTRACT

A position posture identification device includes: an actual measurement data acquisition unit which acquires actual measurement data on the shape of a workpiece; a virtual measurement data generation unit which generates, from shape data defined for the workpiece, virtual measurement data; a filter processing unit which performs, based on the measurement property of the three-dimensional measuring machine, affine transformation on the virtual measurement data; a feature point extraction unit which extracts feature point data from the actual measurement data and the virtual measurement data; a storage unit which stores, as model data of the workpiece, the feature point data extracted from the virtual measurement data; and a position posture calculation unit which checks the feature point data of the actual measurement data against data obtained by performing coordinate transformation on the feature point data included (Continued)

in the model data so as to calculate the position posture of the workpiece.

12 Claims, 6 Drawing Sheets

(51) Int. Cl.
*G06T 3/00* (2006.01)
*B25J 13/08* (2006.01)
*B25J 9/16* (2006.01)
*B25J 19/02* (2006.01)

(52) U.S. Cl.
CPC .............. *B25J 13/08* (2013.01); *B25J 19/023* (2013.01); *G06T 2207/10028* (2013.01); *G06T 2207/20081* (2013.01); *G06T 2207/30164* (2013.01)

(56) References Cited

U.S. PATENT DOCUMENTS

| | | | |
|---|---|---|---|
| 2011/0211066 A1* | 9/2011 | Fujiki | G06T 7/75 348/135 |
| 2013/0108116 A1* | 5/2013 | Suzuki | G06V 20/647 382/106 |
| 2013/0156262 A1* | 6/2013 | Taguchi | G06T 7/521 382/103 |
| 2013/0245828 A1* | 9/2013 | Tateno | G06T 7/75 700/259 |
| 2020/0363815 A1* | 11/2020 | Mousavian | G06K 9/00805 |

OTHER PUBLICATIONS

Drummond, Tom, and Roberto Cipolla. "Real-time visual tracking of complex structures." IEEE Transactions on pattern analysis and machine intelligence 24.7 (2002): 932-946 (Year: 2002).*

* cited by examiner

POSITION POSTURE IDENTIFICATION DEVICE, POSITION POSTURE IDENTIFICATION METHOD AND POSITION POSTURE IDENTIFICATION PROGRAM

This application is based on and claims the benefit of priority from Japanese Patent Application No. 2019-134696, filed on 22 Jul. 2019, the content of which is incorporated herein by reference.

BACKGROUND OF THE INVENTION

Field of the Invention

The present invention relates to a device, a method and a program which detect the position posture of a target article.

Related Art

Conventionally, a system is known which checks model data that is produced based on three-dimensional shape data such as three-dimensional CAD data and that indicates features of the shape of a target article against actual data based on the result of a measurement performed with a three-dimensional measuring machine so as to identify the position posture of the target article, and in which thus a robot performs, for example, an operation of taking out the target article (see, for example, Patent Document 1).

For example, the three-dimensional measuring machine acquires point cloud data including three-dimensional position information on the surface of the article within a measurement range. Virtual point cloud data which is acquired by sampling three-dimensional positions on the surface of the target article is obtained from the three-dimensional shape data. For example, feature points which have shape features such as a corner of the article are extracted from both the point cloud data acquired with the three-dimensional measuring machine and the virtual point cloud data, and they are matched to identify the position posture of the target article. The robot is previously taught the operation on the target article, and modifies the operation according to the position posture of the target article so as to be able to perform the operation even in an environment in which the position posture of the target article is changed.
Patent Document 1: Japanese Unexamined Patent Application, Publication No. 2017-102529

SUMMARY OF THE INVENTION

Although the three-dimensional CAD data normally has the complete three-dimensional shape information of the target article, it is difficult for the three-dimensional measuring machine to acquire the same data. For example, when the three-dimensional measuring machine shoots, with a camera, a pattern obtained by projecting pattern light from a projector, and point cloud data within a measurement region is acquired from the position of the pattern on an image acquired with the camera by the principles of a stereo measurement, the point cloud data is obtained only from a region which the pattern light from the projector hits and which is seen from the camera. In such a case, the three-dimensional measuring machine cannot acquire the point cloud data, for example, on part which is significantly recessed on the surface of the target article.

When the model data includes feature point data on part which the three-dimensional measuring machine cannot measure, a processing load for checking the model data against the actual data based on the result of the measurement so as to identify the position posture of the target article is unnecessarily increased. In particular, a robot system is often configured with only one three-dimensional measuring machine due to restrictions on the cost and system layout thereof and the like. In the configuration described above, point cloud data on a target article can be acquired only from a surface which faces the one three-dimensional measuring machine, and thus in less than half the data, model data and actual data can be associated with each other. When the feature amounts of feature points included in the model data and the actual data are matched, the feature amount on the side of the model data may significantly differ from the feature amount on the side of the actual data due to the influence of the part which the three-dimensional measuring machine does not actually measure. Hence, it is impossible to properly perform the matching, and thus there is a possibility that the position posture of the target article cannot be properly identified.

Therefore, a system which can efficiently identify the position posture of a target article is desired.

A position posture identification device according to an aspect of the present disclosure includes: an actual measurement data acquisition unit which acquires, from a measuring machine, actual measurement data on the shape of a target article; a virtual measurement data generation unit which generates, from shape data defined for the target article, virtual measurement data that is associated with the actual measurement data; a filter processing unit which performs, based on the measurement property of the measuring machine, filter processing that performs affine transformation on the virtual measurement data; a feature point extraction unit which extracts feature point data from the actual measurement data and the virtual measurement data; a storage unit which stores, as model data of the target article, the feature point data extracted from the virtual measurement data; and a position posture calculation unit which checks the feature point data of the actual measurement data against data obtained by performing coordinate transformation on the feature point data included in the model data so as to calculate the position posture of the target article.

A position posture identification method according to an aspect of the present disclosure makes a computer execute: an actual measurement data acquisition step of acquiring, from a measuring machine, actual measurement data on the shape of a target article; a virtual measurement data generation step of generating, from shape data defined for the target article, virtual measurement data that is associated with the actual measurement data; a filter processing step of performing, based on the measurement property of the measuring machine, filter processing that performs affine transformation on the virtual measurement data; a feature point extraction step of extracting feature point data from the actual measurement data and the virtual measurement data; a storage step of storing, as model data of the target article, the feature point data extracted from the virtual measurement data; and a position posture calculation step of checking the feature point data of the actual measurement data against data obtained by performing coordinate transformation on the feature point data included in the model data so as to calculate the position posture of the target article.

A position posture identification program according to an aspect of the present disclosure instructs a computer to function as the position posture identification device.

According to the aspects, it is possible to efficiently identify the position posture of the target article.

DETAILED DESCRIPTION OF THE INVENTION

As the illustration of embodiments of the present invention, a robot system which performs, while identifying the position posture of a workpiece (target article) placed on a table, an operation on the workpiece will be described below.

First Embodiment

Figure 1:
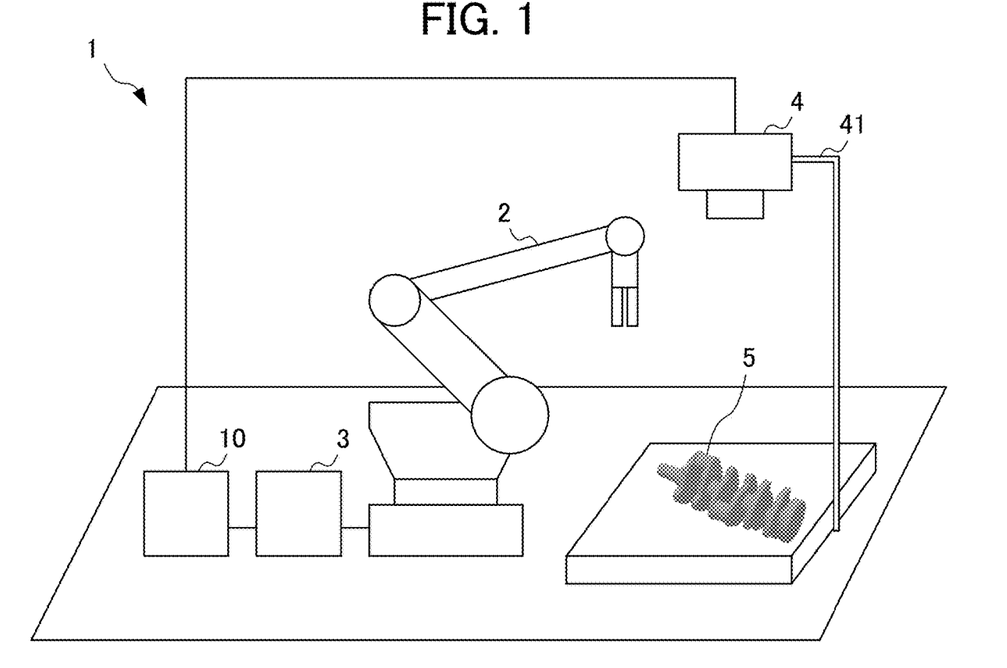
FIG. 1 is a diagram showing an example of the configuration of a robot system in a first embodiment.

FIG. 1 is a diagram showing an example of the configuration of a robot system 1 in a first embodiment. The robot system 1 includes a robot 2, a controller 3, a three-dimensional measuring machine 4 and a position posture identification device 10.

The robot 2 is a multi-joint robot which is driven with motors. In the robot 2, the tip of an arm can be located in an arbitrary position with an arbitrary posture within an operation range determined according to the dimensions and the structure of a mechanism unit, and a workpiece 5 whose position and posture are identified can be appropriately held with, for example, a gripper.

The controller 3 is a computer which is connected to the robot 2 through a communication means such as a communication cable, and controls the operations of motors provided in the individual joints of the robot 2.

The three-dimensional measuring machine 4 is installed in a predetermined positional relationship with the workpiece 5 such that the workpiece 5 serving as the target article placed on a table is included in the field of view. For example, the three-dimensional measuring machine 4 is installed above the workpiece 5 so as to be fixed to a stand 41. The three-dimensional measuring machine 4 detects the surface of the workpiece 5 so as to measure the three-dimensional positions of a plurality of points on the surface.

The three-dimensional measuring machine 4 is a measuring machine which detects a distance up to the workpiece 5 in a noncontact manner, and various types of measuring machines can be adopted. Examples of the three-dimensional measuring machine 4 which can be adopted include: a type that utilizes a plurality of cameras so as to perform a stereo measurement; a type that scans the surface of the workpiece 5 with laser light; a type that projects pattern light on the workpiece 5; a type that calculates a time until light returns to a projector after the light is reflected on the surface of the workpiece 5; and the like. The three-dimensional measuring machine 4 may generate, as measurement data, pixel values corresponding to the measured distance, that is, a distance image in which light and shade are changed.

The position posture identification device 10 is a computer which is connected to the controller 3 and the three-dimensional measuring machine 4 through a communication means such as a communication cable. The position posture identification device 10 identifies the position posture of the workpiece 5 based on the measurement data acquired from the three-dimensional measuring machine 4, and provides the identified information to the controller 3.

Figure 2:
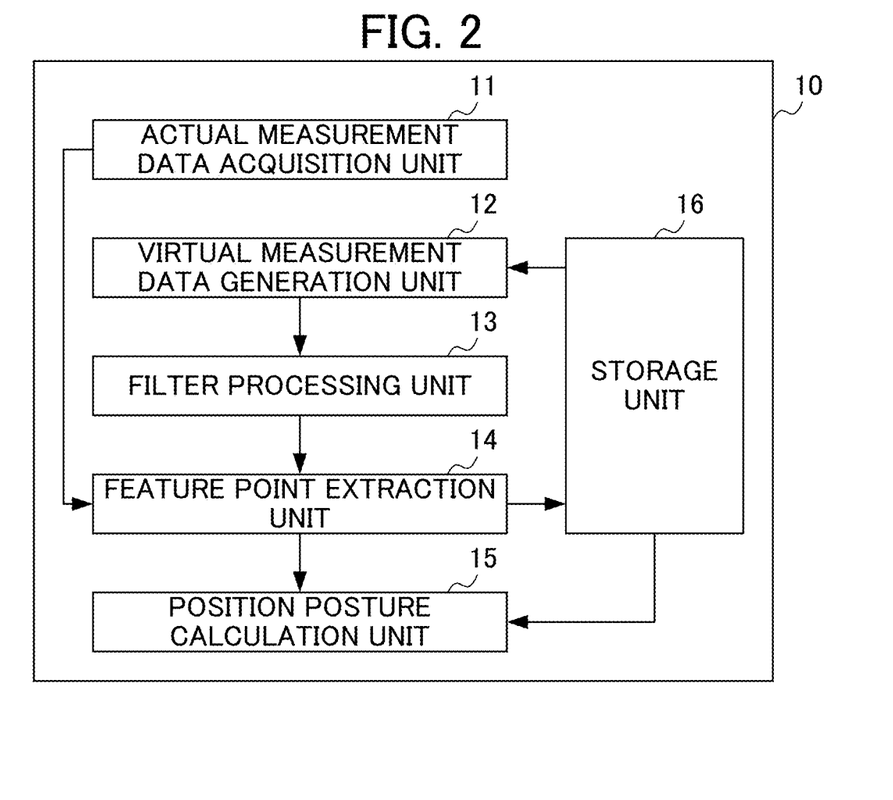
FIG. 2 is a block diagram showing the functional configuration of a position posture identification device in the first embodiment.

FIG. 2 is a block diagram showing the functional configuration of the position posture identification device 10 in the first embodiment. The position posture identification device 10 includes an actual measurement data acquisition unit 11, a virtual measurement data generation unit 12, a filter processing unit 13, a feature point extraction unit 14, a position posture calculation unit 15 and a storage unit 16.

The actual measurement data acquisition unit 11 acquires, from the three-dimensional measuring machine 4, actual measurement data on the shape of the workpiece 5.

The virtual measurement data generation unit 12 generates, based on three-dimensional shape data defined for the workpiece 5, in the same format as the actual measurement data, virtual measurement data which is associated with the actual measurement data. Here, the actual measurement data may be point cloud data which includes three-dimensional position information at a plurality of points on the surface of the workpiece 5. In this case, the virtual measurement data generation unit 12 generates, as the virtual measurement data, the point cloud data obtained by sampling positions on the surface from the three-dimensional shape data.

Figure 3:
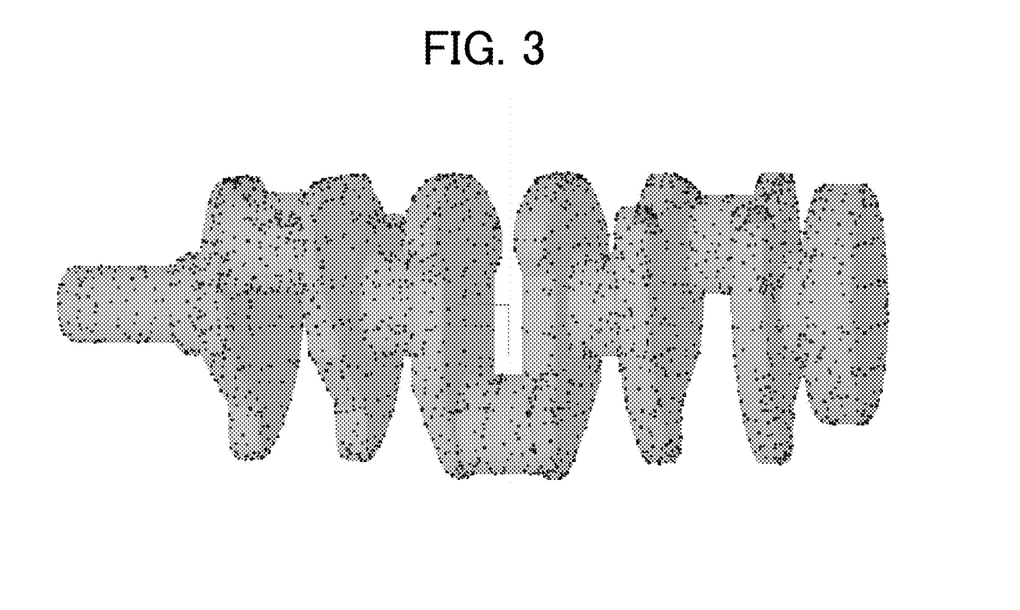
FIG. 3 is a diagram illustrating point cloud data which is obtained by sampling from on the surface of a workpiece in the first embodiment.

FIG. 3 is a diagram illustrating the point cloud data which is obtained by sampling from on the surface of the workpiece 5 in the first embodiment. For example, the point cloud data generated from the three-dimensional shape data may be uniformly arranged on the surface of the workpiece 5. The point cloud data may be arranged such that the point cloud data is suitable for a position posture determination algorithm of the target article utilizing a three-dimensional point cloud model such as Interactive Closest Points (ICP) and that a point cloud is dense in part in which the amount of change in curvature is large.

The filter processing unit 13 performs, based on the measurement property of the three-dimensional measuring machine 4, filter processing which performs affine transformation so as to make the virtual measurement data approach the actual measurement data. Specifically, the filter processing unit 13 omits, from the virtual measurement data, data on part which the three-dimensional measuring machine 4 cannot measure at a rate exceeding a threshold value among various position postures assumed in the workpiece 5, that is, on part in which the probability of appearance is low, or lowers the importance thereof by assigning weights.

The probability of appearance of each of three-dimensional points is a probability that when the workpiece 5 is measured with the three-dimensional measuring machine 4 from various directions, a three-dimensional position can be measured, and is determined as follows. The filter processing unit 13 first assumes various directions (for example, O1 to On) for the three-dimensional shape data of the workpiece 5. For example, O1 to On may be uniformly distributed to all directions. Then, for each of the three-dimensional points of the point cloud data generated as the virtual measurement data, the filter processing unit 13 determines whether or not measurements can be performed with the three-dimensional measuring machine 4 from the directions of O1 to On.

Figure 4:
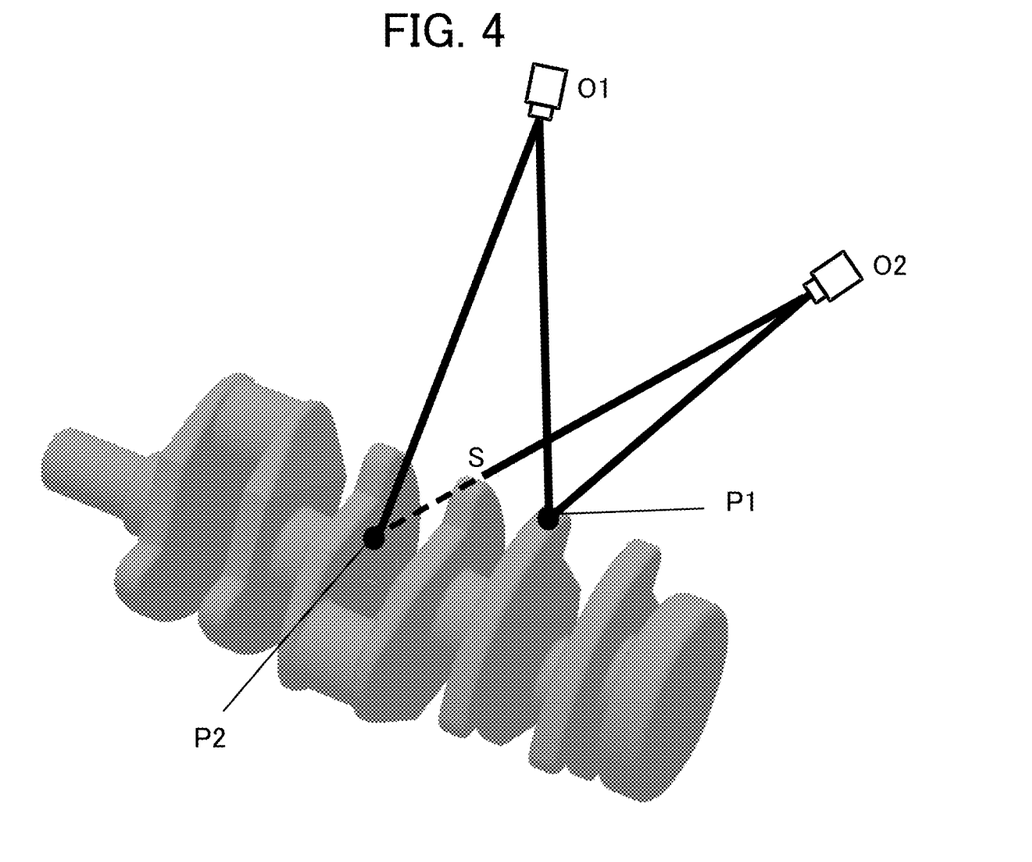
FIG. 4 is a diagram illustrating a difference in the probability of appearance in the first embodiment.

FIG. 4 is a diagram illustrating a difference in the probability of appearance in the first embodiment. For example, a point P1 can be measured from each of the directions of O1 and O2. On the other hand, a point P2 arranged in part which is recessed can be measured from the direction of O1 but cannot be measured from the direction of O2 because the point P2 is hidden by part S of the workpiece 5.

As described above, the filter processing unit 13 determines, for each of the three-dimensional points, whether or not a measurement can be performed from each of the directions of O1 to On, and thereby calculates the probability of appearance of each of the three-dimensional points.

For the determination of whether or not measurements can be performed, the orientation of the surface on which the three-dimensional points are present can also be utilized. For example, in a case where pattern light is projected with the three-dimensional measuring machine 4, where the reflected light is imaged with a camera and where thus a three-dimensional point cloud is acquired, when there is a large difference between the direction of the camera and the orientation of a normal to the surface, the reflected light travelling toward the camera is reduced in intensity, and thus a pattern cannot be recognized with a camera image, with the result that the three-dimensional point of this part cannot be measured. Furthermore, when physical property information such as a reflection property is included in the three-dimensional shape data, the filter processing unit 13 can more accurately simulate a camera image, and thus it is possible to determine whether or not the three-dimensional point can be measured.

Figure 5:
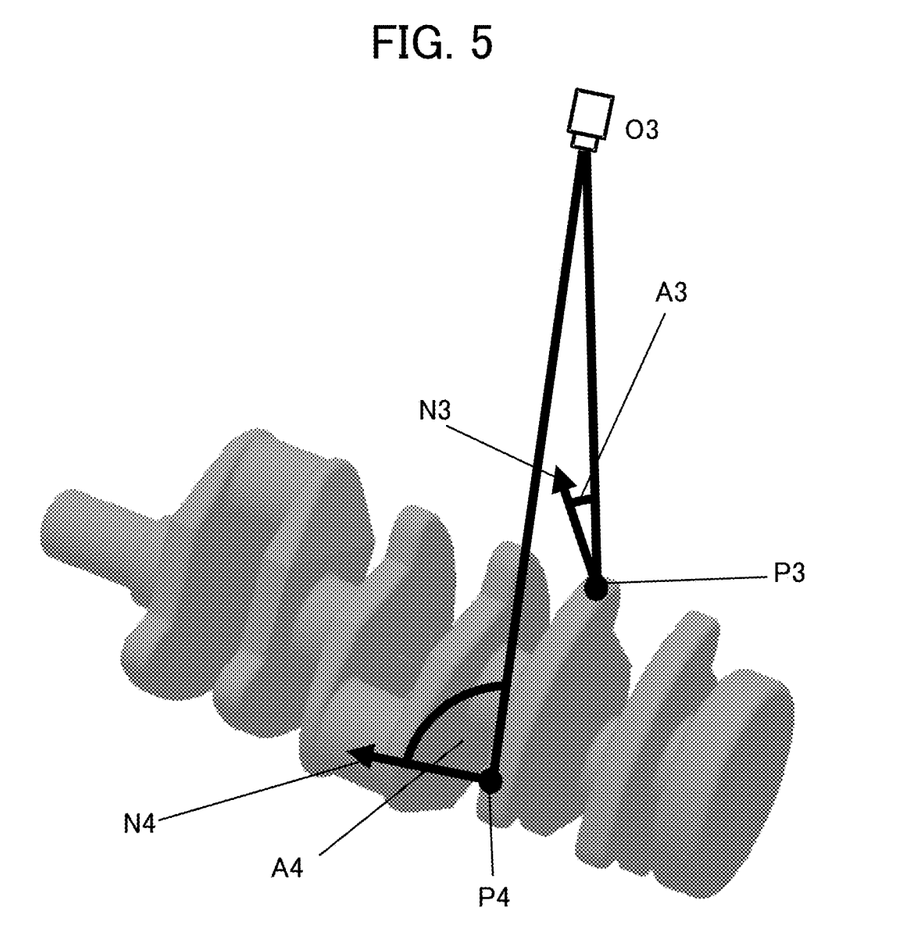
FIG. 5 is a diagram illustrating a method of determining whether or not a measurement can be performed based on the orientation of the surface of the workpiece in the first embodiment.

FIG. 5 is a diagram illustrating a method of determining whether or not a measurement can be performed based on the orientation of the surface of the workpiece 5 in the first embodiment. Although the filter processing unit 13 determines, for example, for a point P3, that since an angle A3 formed by a normal N3 and the direction of the three-dimensional measuring machine 4 (O3) is small, a measurement can be performed, the filter processing unit 13 determines, for a point P4, that since an angle A4 formed by a normal N3 and the direction of O3 is large, a measurement cannot be performed.

Whether the angle is large or small may be determined by a predetermined threshold value.

The feature point extraction unit 14 extracts feature point data from both the measurement data measured with the three-dimensional measuring machine 4 and the virtual measurement data which is generated with the virtual measurement data generation unit 12 and on which the filter processing is performed with the filter processing unit 13. The feature point data extracted from the virtual measurement data is stored in the storage unit 16 as the model data of the workpiece 5.

Here, the feature point data may be, for example, the point cloud data itself or may be obtained by selecting some three-dimensional points and providing, to these three-dimensional points, a feature amount of Point Pair Feature (PPF), Signature of Histogram of Orientation (SHOT) or the like.

The position posture calculation unit 15 checks the feature point data of the actual measurement data against data obtained by performing coordinate transformation on the feature point data included in the model data so as to calculate an evaluation value for the degree of agreement in the matching. Then, the position posture calculation unit 15 calculates the position posture of the workpiece 5 in which the evaluation value is the maximum. For the position posture calculation, for example, a method such as Interactive Closest Point (ICP) may be used. Here, when weights are assigned to the feature point data with the filter processing unit 13, the evaluation value in the matching is increased or decreased according to the weight of agreed or similar part, with the result that the evaluation value for the position posture in which the feature points having a high probability of appearance are agreed or similar is increased.

For example, when as the model data, three-dimensional point cloud data is used without being processed, the number of points which agree with the point cloud data measured with the three-dimensional measuring machine 4 is not used as the evaluation value without being processed, and the evaluation value is calculated such that a weight of agreement for the point having a high probability of appearance is increased, with the result that the position posture calculation unit 15 can select the position posture having a high possibility of a correct answer.

When the evaluation value is calculated as described above, for example, if the position postures of a plurality of articles are identified within the operation region of the robot 2, the robot 2 can perform the operation on the article in which the evaluation value serving as an index for the confidence of the position posture is the maximum.

Figure 6:
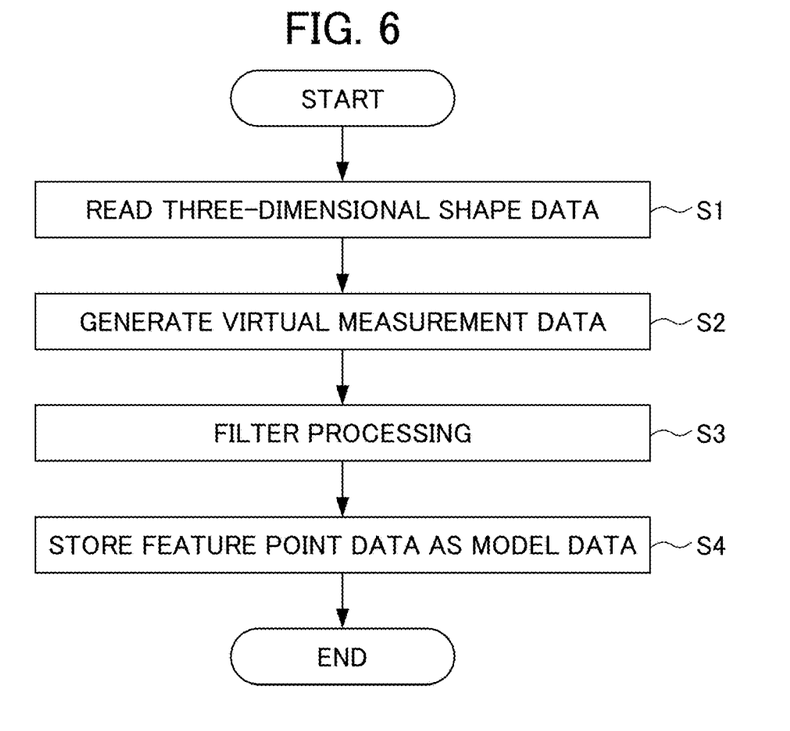
FIG. 6 is a flowchart showing the generation processing of model data for checking against actual data with the position posture identification device in the first embodiment.

FIG. 6 is a flowchart showing the generation processing of the model data for checking against actual data with the position posture identification device 10 in the first embodiment. Here, the three-dimensional measuring machine 4 acquires, as the measurement data, the point cloud data which is a collection of the three-dimensional position information on the surface of the workpiece 5, and the virtual measurement data is also generated as the point cloud data on the surface of the workpiece 5.

In step S1, the virtual measurement data generation unit 12 reads the three-dimensional shape data (for example, three-dimensional CAD data) of the workpiece 5.

In step S2, the virtual measurement data generation unit 12 samples the three-dimensional points on the surface of the workpiece 5 so as to generate the virtual measurement data.

In step S3, the filter processing unit 13 performs, based on the measurement property of the three-dimensional measuring machine 4, the filter processing on the individual three-dimensional points of the virtual measurement data generated in step S2 so as to make a selection or assign weights.

In step S4, the feature point extraction unit 14 extracts the feature point data from the virtual measurement data, and stores it as the model data in the storage unit 16.

Figure 7:
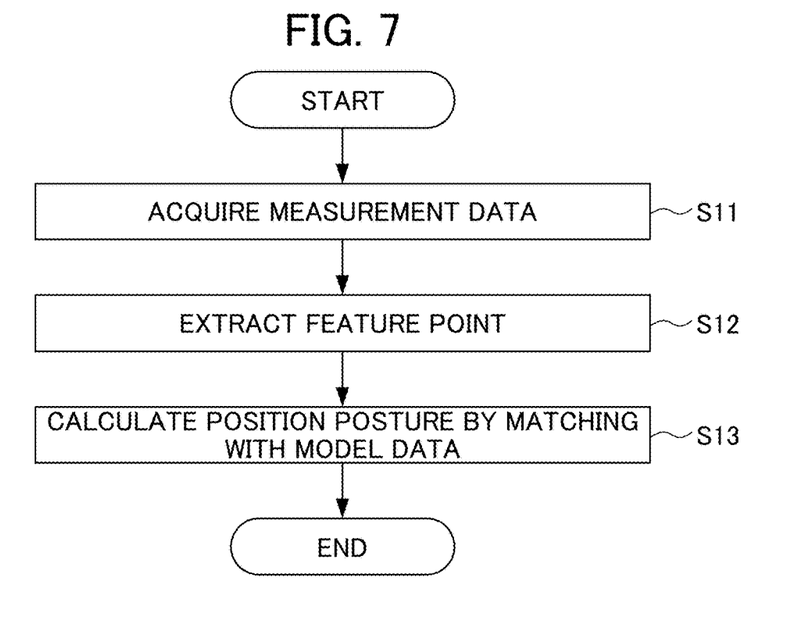
FIG. 7 is a flowchart showing the calculation processing of a position posture using the model data in the first embodiment.

FIG. 7 is a flowchart showing the calculation processing of the position posture using the model data in the first embodiment. In the present processing, it is assumed that the model data is previously stored by the generation processing of the model data in FIG. 6.

In step S11, the actual measurement data acquisition unit 11 acquires the actual measurement data of the workpiece 5 measured with the three-dimensional measuring machine 4.

In step S12, the feature point extraction unit 14 extracts the feature point data from the acquired actual measurement data.

In step S13, the position posture calculation unit 15 performs matching between the feature point data extracted in step S12 and the stored model data so as to calculate the position posture.

Second Embodiment

In the first embodiment, for the workpiece 5, the calculation of the position posture is performed with one item of model data in which the direction of the three-dimensional measuring machine 4 is not limited. In the second embodiment, the initial value of the position posture calculation is given, and specific model data for a case where the three-dimensional measuring machine 4 is present in a direction associated with the initial value is used.

In the filter processing using the filter processing unit 13, a plurality of directions of the three-dimensional measuring machine 4 which are assumed when the probability of appearance of each of the three-dimensional points is calculated do not need to be distributed to all directions. For example, the filter processing unit 13 may determine data in which the direction of the three-dimensional measuring machine 4 with respect to the workpiece 5 is set to the direction associated with the initial value of the position posture calculation of the workpiece 5, and in which the importance thereof is lowered by omission from the virtual measurement data or by assigning a weight based on the measurement property from the vicinity (predetermined range) including this direction. When as described above, the feature point data is extracted with the feature point extraction unit 14 from the virtual measurement data on which the filter processing is performed according to the direction of the three-dimensional measuring machine 4, the feature point data is stored as the model data in the storage unit 16 so as to correspond to this direction.

Here, the initial value of the position posture calculation may be a value within a range which is limited by restrictions on an environment where the target article is placed or the result of simple position posture calculation which is separately provided. In the simple position posture calculation, a rough position posture is calculated, and the result of this calculation is input as the initial value to the position posture calculation unit 15. Then, the model data is generated from the virtual measurement data on which the filter processing is performed based on the initial value of the position posture that is input, and the position posture calculation unit 15 uses the generated model data so as to calculate the position posture.

For example, in a literature A below, Deformable Parts Model (DPM) is utilized, and thus a rough position posture is estimated. Although the DPM is used for identifying the region of an object in an image, the DPM is also utilized for identifying a rough posture at high-speed.

Literature A: M. Zhu, K. G. Derpanis, Y. Yang, S. Brahmbhatt, M. Zhang, C. Phillips, M. Lecce, K. Daniilidis, "Single Image 3D Object Detection and Pose Estimation for Grasping," 2014 IEEE International Conference on Robotics & Automation.

The model data corresponding to the initial value of the position posture of the workpiece 5 may be previously generated. For example, the filter processing unit 13 receives a plurality of directions of the three-dimensional measuring machine 4 with respect to the workpiece 5, and stores, in the storage unit 16, a plurality of items of model data which are respectively associated with the individual directions. The position posture calculation unit 15 may use the item of model data associated with the direction closest to the initial value which is input so as to calculate the position posture.

Third Embodiment

In the first and second embodiments, the three-dimensional point cloud data is used as the actual measurement data and the virtual measurement data. In the third embodiment, as the actual measurement data, a distance image of the workpiece 5 is used, and the virtual measurement data is generated according to this distance image.

Here, since the distance image indicates a distance from the three-dimensional measuring machine 4 up to a point on the surface of the workpiece 5, the virtual measurement data generation unit 12 generates, based on the three-dimensional shape data, the distance image as the virtual measurement data with the direction of the three-dimensional measuring machine 4 set to an input. Since the distance image is data based on the direction of the three-dimensional measuring machine 4, when it is necessary to search for a wide range of position postures, the virtual measurement data generation unit 12 generates, according to the range of the search (for example, all directions), distance images based on a plurality of directions. In this case, the feature point extraction unit 14 extracts the feature point from each of a plurality of distance images, and thereafter stores, in the storage unit 16, one item of model data into which they are integrated.

The filter processing unit 13 may use a machine learning model in which the virtual measurement data in a known position posture is an input and in which the actual measurement data is an output so as to perform affine transformation on the virtual measurement data. For example, when as the actual measurement data, the distance image is acquired from the three-dimensional measuring machine 4, in order to match the feature point data extracted from this distance image including noise with the model data, the filter processing unit 13 performs, with Convolutional Neural Network (CNN), affine transformation so as to make the virtual measurement data approach the actual measurement data.

Figure 8A:
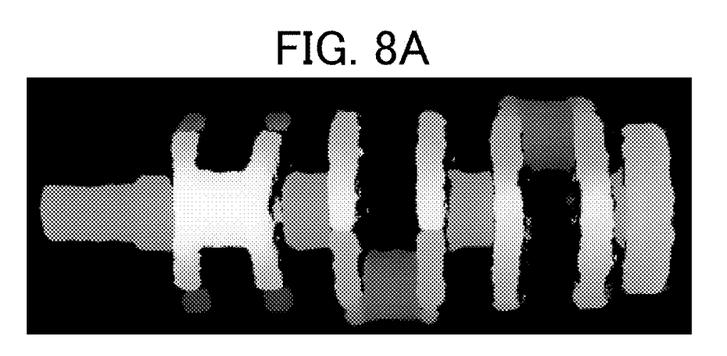
FIG. 8A is a diagram illustrating a distance image of actual measurement data in a third embodiment.
Figure 8B:
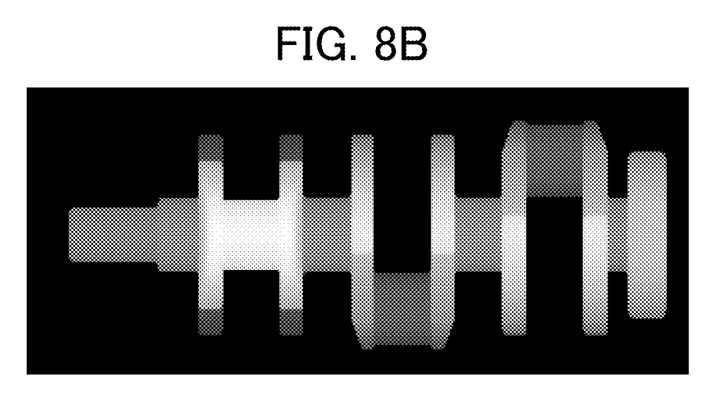
FIG. 8B is a diagram illustrating a distance image of virtual measurement data in the third embodiment.

FIGS. 8A and 8B are diagrams which compare distance images of the actual measurement data and the virtual measurement data in the third embodiment and which illustrate them.

Although the distance image serving as the actual measurement data includes noise as in FIG. 8A, the distance image serving as the virtual measurement data does not normally include noise as in FIG. 8B. The distance image expresses the distance from the three-dimensional measuring machine 4 by use of light and shade of pixels. In this example, as the distance becomes longer, the color becomes darker (closer to black), and part of black indicates a region in which the distance cannot be measured.

Here, a data set for learning does not need to be data of the target article. In the range of the measurement of the three-dimensional measuring machine 4, an article whose three-dimensional shape is known is arranged in a specific position, and the distance image which is actually acquired from the three-dimensional measuring machine 4 is set to teacher data indicating an answer after transformation. The virtual measurement data which is acquired based on a positional relationship between an article when a measurement is actually performed with the three-dimensional measuring machine 4 and the three-dimensional measuring machine 4 is set to input data before transformation. Then, for example, a stage in which the position posture of the article whose three-dimensional shape is known can be changed variously or the like is utilized, a large number of sets of the input data before transformation and the teacher data after transformation are used to perform previous learning and a learned model is stored.

The target to which the machine learning as described above is applied is not limited to the distance image. The filter processing unit 13 may perform affine transformation using the machine learning model, that is, transformation of the three-dimensional position information on the point cloud data of the virtual measurement data in the first or second embodiment.

The distance image serving as the actual measurement data may be transformed into the point cloud data. In this case, when the virtual measurement data is also transformed into the point cloud data, the point cloud data can be processed in the same manner as in the first or second embodiment.

According to the embodiments described above, it is possible to obtain, for example, operational effects below.

(1) A position posture identification device 10 includes: an actual measurement data acquisition unit 11 which acquires, from a three-dimensional measuring machine 4, actual measurement data on the shape of a workpiece 5; a virtual measurement data generation unit 12 which generates, from shape data defined for the workpiece 5, virtual measurement data that is associated with the actual measurement data; a filter processing unit 13 which performs, based on the measurement property of the three-dimensional measuring machine 4, filter processing that performs affine transformation on the virtual measurement data; a feature point extraction unit 14 which extracts feature point data from the actual measurement data and the virtual measurement data; a storage unit 16 which stores, as model data of the workpiece 5, the feature point data extracted from the virtual measurement data; and a position posture calculation unit 15 which checks the feature point data of the actual measurement data against data obtained by performing coordinate transformation on the feature point data included in the model data so as to calculate the position posture of the workpiece 5.

In this way, the position posture identification device 10 omits, from the virtual measurement data, unnecessary data which can be seen only at a specific angle or lowers the importance thereof by assigning weights thereto, and thus matching processing using unnecessary virtual measurement data is reduced, with the result that it is possible to efficiently identify the position posture of the workpiece 5. Furthermore, the position posture identification device 10 can reduce a variation in the feature amount caused by unnecessary data, and consequently, the accuracy of identification of the position posture is enhanced.

(2) In the position posture identification device 10 described in (1), the filter processing unit 13 may receive the direction of the three-dimensional measuring machine 4 with respect to the workpiece 5, and may perform the filter processing based on a measurement property from the vicinity including the direction.

In this way, when the direction of the three-dimensional measuring machine 4 is somewhat limited, the position posture identification device 10 can appropriately generate specific virtual measurement data for this direction.

(3) In the position posture identification device 10 described in (2), the filter processing unit 13 may receive a plurality of directions of the three-dimensional measuring machine 4 with respect to the workpiece 5, and the storage unit 16 may store, as a plurality of items of model data, the feature point data extracted with the feature point extraction unit 14 from the virtual measurement data such that the items of model data are respectively associated with the directions received by the filter processing unit 13.

In this way, the position posture identification device 10 previously prepares a plurality of items of model data specific for the respective directions so as to appropriately select the model data, and thereby can enhance the accuracy of calculation of the position posture.

(4) In the position posture identification device 10 described in (3), the position posture calculation unit 15 may receive the initial value of position posture calculation of the workpiece 5, and may use, among the items of model data stored in the storage unit 16, the item of model data associated with the direction closest to the initial value so as to calculate the position posture of the workpiece 5.

While a method of a model base which utilizes the three-dimensional shape of an article generally allows accurate alignment, the processing time thereof tends to be long.

Hence, for example, by combination with a rapid method of an appearance base which utilizes an image, the range of position postures can be rapidly narrowed down, and thus it is possible to increase the speed of the processing as a whole.

(5) In the position posture identification device 10 described in (2), the position posture calculation unit 15 may receive the initial value of position posture calculation of the workpiece 5, and may use the model data obtained by inputting the direction of the three-dimensional measuring machine 4 corresponding to the initial value to the filter processing unit 13 so as to calculate the position posture of the workpiece 5.

In this way, when the initial value of the position posture is given such as by rough position posture calculation, the position posture identification device 10 uses specific model data for the direction of the three-dimensional measuring machine 4 corresponding to this initial value so as to be able to accurately identify the position posture of the workpiece 5.

(6) In the position posture identification device 10 described in any one of (1) to (5), the actual measurement data is point cloud data which includes three-dimensional position information at a plurality of points on the surface of the workpiece 5, and the virtual measurement data generation unit 12 may generate, as the virtual measurement data, point cloud data obtained by sampling positions on the surface from the three-dimensional shape data.

In this way, the position posture identification device 10 can efficiently identify the position posture of the workpiece 5 by an existing matching method using the point cloud.

(7) In the position posture identification device 10 described in (6), the filter processing unit 13 may assign, according to the probability of appearance, weights to individual points included in the virtual measurement data, and the position posture calculation unit 15 may calculate, in the checking of the feature point data, an evaluation value for the degree of agreement based on the weights.

In this way, the position posture identification device 10 can highly evaluate matching in part which has a high probability of appearance, for example, which is highly likely to be measured and which is projected, and can give a low evaluation to matching in part which has a low probability of appearance, for example, which is unlikely to be measured and which is recessed. Hence, the position posture identification device 10 emphasizes part which is highly likely to be actually measured, and lowers an influence caused by erroneous matching in part which is unlikely to be measured, with the result that it is possible to accurately calculate the position posture.

(8) In the position posture identification device 10 described in any one of (1) to (5), the actual measurement data is a distance image of the workpiece 5, and the virtual measurement data generation unit 12 may generate, as the virtual measurement data, a distance image obtained by transformation from the three-dimensional shape data so as to correspond to each of one or more directions of the three-dimensional measuring machine 4.

In this way, when the distance image is acquired from the three-dimensional measuring machine 4, the position posture identification device 10 generates the same virtual measurement data from the three-dimensional shape data so as to be able to efficiently identify the position posture of the workpiece 5 by the matching of the feature point.

(9) In the position posture identification device 10 described in (6) or (8), the filter processing unit 13 may use a machine learning model in which the virtual measurement data in a known position posture is an input and in which the actual measurement data is an output so as to perform affine transformation on the virtual measurement data.

In this way, the position posture identification device 10 can reduce a processing load when the position posture is identified by making the previously generated virtual measurement data approach the actual measurement data, as compared with a general method of compensating for the actual measurement data to data free of noise.

Although the embodiments of the present invention have been described above, the present invention is not limited to the embodiments described above. The effects described in the present embodiments are simply a list of the most preferred effects produced from the present invention, and the effects of the present invention are not limited to those described in the present embodiments.

A position posture identification method using the position posture identification device 10 is realized by software. When the position posture identification method is realized by software, the programs of this software are installed into a computer. These programs may be recorded in a removable medium so as to be distributed to a user or may be downloaded through a network into a computer of the user so as to be distributed thereto.

EXPLANATION OF REFERENCE NUMERALS 1 robot system
2 robot
3 controller
4 three-dimensional measuring machine
5 workpiece
10 position posture identification device
11 actual measurement data acquisition unit
12 virtual measurement data generation unit
13 filter processing unit
14 feature point extraction unit
15 position posture calculation unit
16 storage unit

What is claimed is:

1. A position posture identification device comprising:
   an actual measurement data acquisition unit which acquires, from a measuring machine, actual measurement data on a shape of a target article;
   a virtual measurement data generation unit which generates, from shape data defined for the target article, virtual measurement data that is associated with the actual measurement data;
   a filter processing unit which performs, based on a measurement property of the measuring machine, filter processing that performs transformation on the virtual measurement data so as to make the virtual measurement data approach the actual measurement data;
   a feature point extraction unit which extracts feature point data from the actual measurement data and the virtual measurement data;
   a storage unit which stores, as model data of the target article, the feature point data extracted from the virtual measurement data; and
   a position posture calculation unit which checks the feature point data of the actual measurement data against data obtained by performing coordinate transformation on the feature point data included in the model data so as to calculate a position posture of the target article.

2. The position posture identification device according to claim 1, wherein
   the filter processing unit receives a direction of the measuring machine with respect to the target article, and performs the filter processing based on a measurement property from a vicinity including the direction.

3. The position posture identification device according to claim 2, wherein
   the filter processing unit receives a plurality of directions of the measuring machine with respect to the target article, and
   the storage unit stores, as a plurality of items of model data, the feature point data extracted with the feature point extraction unit from the virtual measurement data such that the items of model data are respectively associated with the directions received by the filter processing unit.

4. The position posture identification device according to claim 3, wherein
   the position posture calculation unit receives an initial value of position posture calculation of the target article, and uses, among the items of model data stored in the storage unit, the item of model data associated with the direction closest to the initial value so as to calculate the position posture of the target article.

5. The position posture identification device according to claim 2, wherein
   the position posture calculation unit receives an initial value of position posture calculation of the target article, and uses the model data obtained by inputting the direction of the measuring machine corresponding to the initial value to the filter processing unit so as to calculate the position posture of the target article.

6. The position posture identification device according to claim 1, wherein
   the actual measurement data is point cloud data which includes three-dimensional position information at a plurality of points on a surface of the target article, and
   the virtual measurement data generation unit generates, as the virtual measurement data, point cloud data obtained by sampling positions on the surface from the shape data.

7. The position posture identification device according to claim 6, wherein
   the filter processing unit assigns, according to a probability of appearance, weights to individual points included in the virtual measurement data, and
   the position posture calculation unit calculates, in the checking of the feature point data, an evaluation value for a degree of agreement based on the weights.

8. The position posture identification device according to claim 6, wherein
the filter processing unit uses a machine learning model in which the virtual measurement data in a known position posture is an input and in which the actual measurement data is an output so as to perform transformation on the virtual measurement data.

9. The position posture identification device according to claim 1, wherein
the actual measurement data is a distance image of the target article, and
the virtual measurement data generation unit generates, as the virtual measurement data, a distance image obtained by transformation from the shape data so as to correspond to each of one or more directions of the measuring machine.

10. The position posture identification device according to claim 9, wherein
the filter processing unit uses a machine learning model in which the virtual measurement data in a known position posture is an input and in which the actual measurement data is an output so as to perform transformation on the virtual measurement data.

11. A position posture identification method of making a computer execute:
an actual measurement data acquisition step of acquiring, from a measuring machine, actual measurement data on a shape of a target article;
a virtual measurement data generation step of generating, from shape data defined for the target article, virtual measurement data that is associated with the actual measurement data;
a filter processing step of performing, based on a measurement property of the measuring machine, filter processing that performs transformation on the virtual measurement data so as to make the virtual measurement data approach the actual measurement data;
a feature point extraction step of extracting feature point data from the actual measurement data and the virtual measurement data;
a storage step of storing, as model data of the target article, the feature point data extracted from the virtual measurement data; and
a position posture calculation step of checking the feature point data of the actual measurement data against data obtained by performing coordinate transformation on the feature point data included in the model data so as to calculate a position posture of the target article.

12. A non-transitory computer readable medium which records a position posture identification program for instructing a computer to function as the position posture identification device according to claim 1.

* * * * *